US005408390A

United States Patent [19]

Yatsunami

[11] Patent Number: 5,408,390

[45] Date of Patent: Apr. 18, 1995

[54] PROJECTOR-TYPE HEADLAMP FOR VEHICLES

[75] Inventor: Ikutaka Yatsunami, Isehara, Japan

[73] Assignee: Ichikoh Industries, Ltd., Tokyo, Japan

[21] Appl. No.: 35,338

[22] Filed: Mar. 18, 1993

[30] Foreign Application Priority Data

Mar. 18, 1992 [JP] Japan .............................. 4-14647 U

[51] Int. Cl.$^{6}$ .............................................. B60Q 1/04

[52] U.S. Cl. ...................................... 362/61; 362/297; 362/348

[58] Field of Search ................. 362/61, 347, 297, 298, 362/310, 346, 348

[56] References Cited

U.S. PATENT DOCUMENTS 1,449,568 3/1923 White ................................. 362/297
4,612,608 9/1986 Peitz .................................. 362/346
5,034,867 9/1991 Mayer .................................. 362/61

FOREIGN PATENT DOCUMENTS 0112397 7/1984 European Pat. Off. .
0355815 2/1990 European Pat. Off. .
1-276502 11/1989 Japan .

*Primary Examiner*—Ira S. Lazarus
*Assistant Examiner*—Y. Quach
*Attorney, Agent, or Firm*—Foley & Lardner

[57] ABSTRACT

A projector-type headlamp comprises a concave mirror having a reflecting inner surface, a lamp bulb and a convex lens which project forwardly the rays of light emitted from the lamp bulb and reflected at the concave mirror. The reflecting inner surface has formed in at least a portion thereof a light diffusion area consisting of a portion of each of different curved conical surfaces. Since the light diffusion area diffuses light rays at a higher rate in the area near the central portion of the concave mirror than in the peripheral area thereof, it is possible to alleviate the driver's feeling that the luminosity in the hot zone formed near the center of the luminous intensity distribution pattern is too strong.

16 Claims, 9 Drawing Sheets

PROJECTOR-TYPE HEADLAMP FOR VEHICLES

BACKGROUND OF THE INVENTION a) Field of the Invention

The present invention relates to a projector-type headlamp having a lamp bulb provided near the inner focus of a concave mirror, and a convex lens refracting forward rays of light emitted from the lamp bulb and reflected at the concave mirror so as to be nearly parallel with each other. More particularly the present invention relates to an improved and novel projector-type headlamp in which the reflected light rays are diffused at a higher rate in a portion near the center of the concave mirror of the light reflector and at a lower rate in the periphery of the concave mirror.

b) Prior-art Statement

The automotive headlamp must be able to illuminate brightly the road surface in front of the car running on a lane while having such a luminous intensity distribution pattern as will not dazzle the driver of a car running on the opposite lane.

For such a luminous intensity distribution as not to dazzle the driver of a car running on the opposite lane, for a simple lens configuration and for a totally compact design, projector-type automotive headlamps have been proposed. FIGS. 1 to 3 show an example projector-type headlamp. FIG. 1 is a schematic plan view of the headlamp, FIG. 2 is a side elevation of the headlamp in FIG. 1, and FIG. 3 is a front view of the headlamp in FIG. 1.

The reference numeral I denotes a concave mirror, and the symbol F denotes a focus of the mirror 1. The reference numeral 2 denotes a lamp bulb of which the filament is located near the focus F. The reference numeral 3 denotes a convex lens having an optical axis Z which is coincident with that of the concave mirror 1.

The line i–j in FIG. 1 indicates the meridional image plane of the convex lens 3, upon which the rays of light emitted from the light source (lamp bulb) and reflected at the concave mirror 1 are incident.

The above-mentioned incident light rays are refracted and emitted forward (rightward in FIGS. 1 and 2) by the convex lens 3. When a screen is disposed near the meridional image plane, an isolux line results from the luminous intensity distribution pattern as shown in FIG. 4. The line H—H is a horizontal line on the screen, and the line V—V is a vertical line on the screen.

As shown in FIGS. 1 to 3, there is provided a shade 4 having a cut line along the meridional image plane. More particularly, the cut line 4*a* is so formed as to extend downward from the horizontal section i–j of the meridional image plane as shown in FIG. 3. FIG. 4 shows the correspondence between the luminous intensity distribution pattern and the shade 4. As seen, the upper half of the light beam is passed forward. The shade 4 intercepts the majority of the lower half. The rest of the lower half, above the cut line 4*a*, is allowed to go forward. FIG. 5 is an explanatory drawing schematically showing the light projection pattern by an isolux line on a screen located in front of the headlamp.

The luminous intensity distribution pattern shown in FIG. 5 creates a light beam suitably used when two cars pass each other. However, when a car runs with no car on the opposite lane, the light beam may not be cut by the cut line 4*a*'. When the shade 4 is omitted from the projector-type headlamp shown in FIGS. 1 to 3, the hatched portion of the light beam in FIG. 4 will not be cut off and thus a luminous intensity distribution pattern shown in FIG. 6 results.

FIGS. 7(A) and 7(B) are explanatory drawings showing in further detail the luminous intensity distribution pattern of the conventional projector-type headlamp. The pattern in FIG. 7(A) is essentially similar to that shown in FIG. 6. In these Figures, the maximum luminosity zone of the pattern (so-called "hot zone") is shown as smudged. The luminosity distribution along the line H—H in FIG. 7(A) is shown in FIG. 7(B).

As seen from FIG. 7(B), the existence of the high-luminosity (hot) zone formed near the center of the luminous intensity distribution pattern will make it difficult for the car driver to discriminate or visually recognize the vehicle, walker or other object in the lower-luminosity zone around the hot zone. Namely, the car driver feels the luminosity in the hot zone too strong to drive the car safely.

Any effective technique to alleviate the driver's feeling that the spotzone luminosity is too strong has not yet been developed, but a technique to suppress the unevenness of the luminous intensity distribution in the hot zone has been proposed in, for example, the Japanese Unexamined Patent Publication No. 01-276502. FIGS. 8 and 9 are drawings for explaining this conventional technique. As seen from FIG. 8, the entire reflecting inner surface of the concave mirror 21 comprises a plurality of vertical, horizontally symmetrical segments a, a'; b, b'; . . . ; i, i'. Each of the segments is formed from a curved cylindrical surface. As shown in FIG. 9, the segments a, b, . . . , i in the right half of the reflecting surface of the concave mirror 21 are so arranged as to form a horizontal section which is a nearly concave arc. The reference symbols a', b', . . . , i' for the segments in the left half are omitted but they are so arranged as to form a similar nearly concave arc.

Such reflecting inner surface of the concave mirror 21 is composed of a plurality of segments formed on the inner surface of an ellipse having a first focus $F_1$ and second focus $F_2$. A lamp bulb is disposed nearly on the first focus $F_1$. In an ordinary conventional projector-type headlamp having the elliptical surface as the reflecting inner surface, the light rays emitted from the lamp bulb located at the first focus $F_1$ are concentrated at the second focus $F_2$.

In case of the concave mirror 21 having the reflecting inner surface composed of a plurality of above-mentioned segments; however, the light rays emitted from the lamp bulb located at the first focus $F_1$ are slightly diffused and concentrated at a position somehow off the focus $F_2$, that is, between points $f_1$ and $f_2$. As a result, the filament image formed at the second focus $F_2$ will be blurred horizontally.

When projected forward through the convex lens 3 shown in FIG. 9, the blurred image will diverge through a very small angle of $\Delta\theta$ (smaller than 1° in this case). As a result, the unevenness of luminous intensity distribution in the hot zone shown in FIG. 7(B) will be suppressed. With the conventional projector-type headlamp using a concave mirror having such a curved cylindrical diffusion surface, however, the driver's feeling that the luminosity in the hot zone formed near the center of the luminous intensity distribution pattern is too strong cannot yet be eliminated.

As shown in FIG. 8, the lamp bulb is located near the point O, the center of the concave mirror 21. Of the reflecting inner surface of the concave mirror, the portion near the axis X—X (for example, portion J) is nearer the light source than the portion far from the axis X—X (for example, portion K), so that the luminous density of the incident light upon the portion near the axis X—X is larger. Therefore, the reflected light at the portion near the axis X—X is contributed primarily to forming of a hot zone.

For these points of view, it is more effective to diffuse the reflected light at the portion near the center of the concave mirror than to diffuse the reflected light at the peripheral portion of the concave mirror, for the driver not to feel the luminosity of the hot zone too strong.

SUMMARY OF THE INVENTION

The present invention has an object to provide a projector-type headlamp which will not provide any hot zone of which the luminosity is not too strong for the car driver.

The present invention has another object to provide a projector-type headlamp having such a light diffusion area that the light diffusion at the portion near the center of the reflecting concave curved surface, which portion being contributed primarily to the formation of the hot zone, is higher in rate than that of the light diffusion at the peripheral portion thereof.

The above object is accomplished by providing a projector-type headlamp comprising a concave mirror having a reflecting inner surface, a lamp bulb so disposed as to have the optical axis thereof set coincident with the center axis of the concave mirror, and a convex lens forming the rays of light emitted from the lamp bulb and reflected at the concave mirror into a light beam nearly parallel to the optical axis and projecting the light beam forwardly, the inner surface of the concave mirror having a reflecting area of which the optical characteristics are such that the light rays emitted from the lamp bulb and incident upon the concave mirror are reflected toward the meridional image plane of the convex lens, the reflecting area having formed in at least a portion thereof a light diffusion area consisting of a portion of each of different curved conical surfaces.

The light diffusion area consists of elongated areas, that is, segments, defined by a plurality of regularly spaced vertical planes parallel to the optical axis, the segments being formed from different curved conical surfaces, respectively.

The intersections of arbitrary horizontal planes with the different curved conical surfaces formed in the segments are of such an arc that the maximum distance h between the intersection and the intersection of the arbitrary horizontal planes with the reflecting area is constant.

More particularly, the depth or height of the curved conical surfaces formed for the segments, respectively, with respect to the reflecting area are constant independently of the locations of the segments.

The different curved conical surfaces on the segments formed on the reflecting area may be either concave with respect to the reflecting area or convex with respect to the reflecting area. Owing to this concave or convex form of the curved conical surface, a rational rate of light diffusion can be provided. Namely, the light rays are diffused at a higher rate at the central portion of the concave mirror, which forms primarily the hot zone, while the light rays are diffused at a lower rate at the peripheral portion thereof not so much involved in forming the hot zone. As a result, the driver's feeling that the luminosity in the hot zone formed by the projector-type headlamp is too strong can be effectively alleviated, which will not adversely affect the luminous intensity distribution in other than the hot zone.

BRIEF DESCRIPTION OF THE DRAWINGS

FIGS. 10 to 15 show together an embodiment of the projector-type headlamp according to the present invention, of which:

FIG. 10 is a schematic front view of the concave mirror in the projector-type headlamp;

FIG. 11 is a horizontal sectional view, taken along the line XI—XI in FIG. 10, of the concave mirror of the projector-type headlamp, in which the intersections of the lines 11A—11A and B″—B″ with the concave mirror are indicated with **11*a*-11*a*′-11*a*″ and 11*b*-11*b*′-11*b*″**, respectively;

DETAILED DESCRIPTION OF THE PREFERRED EMBODIMENTS

Figure 1:
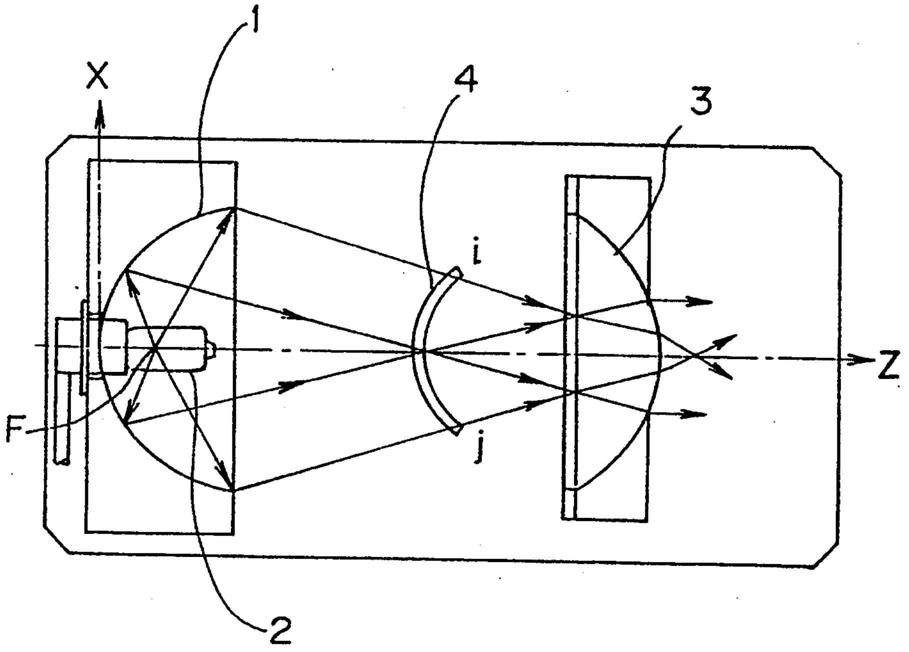
FIG. 1 PRIOR ART
FIG. 1 is a schematic plan view of the conventional projector-type headlamp, showing the construction of the projector-type headlamp.
Figure 2:
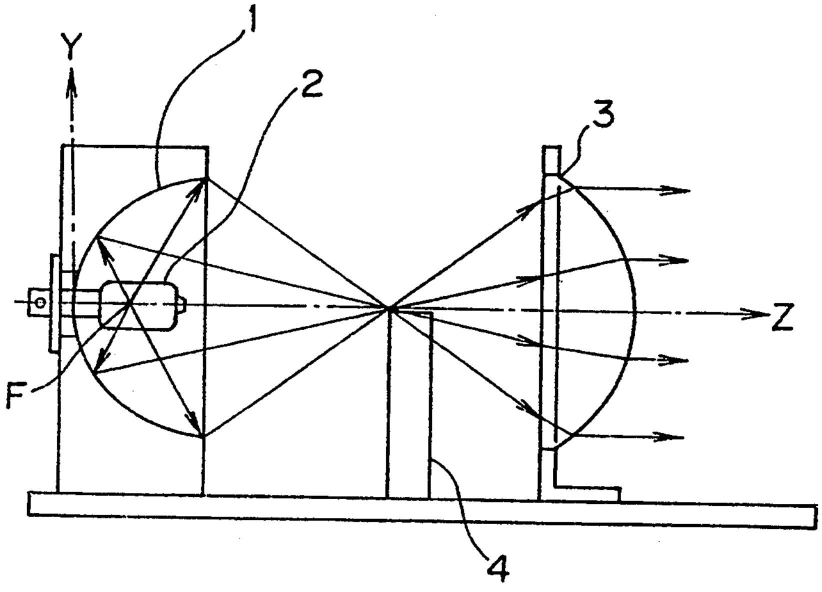
FIG. 2 PRIOR ART
FIG. 2 s a schematic side elevation of the projector-type headlamp shown in FIG. 1.
Figure 3:
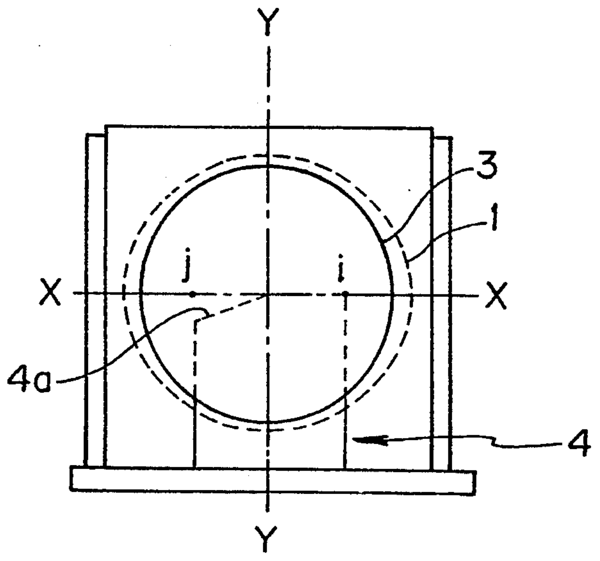
FIG. 3 PRIOR ART
FIG. 3 is a schematic front view of the projector-type headlamp shown in FIG. 1.
Figure 4:
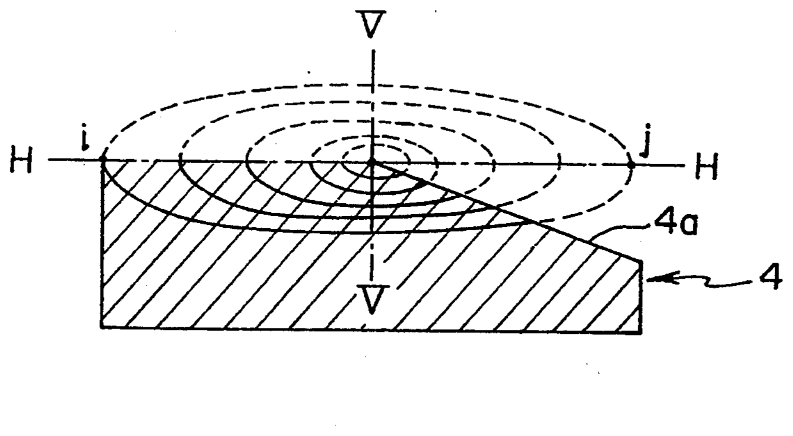
FIG. 4 PRIOR ART
FIG. 4 is a schematic view of the luminous intensity distribution pattern shaped by the shade in the projector-type headlamp.

Referring to FIGS. 10 to 15, one embodiment of the projector-type headlamp according to the present invention will be described herebelow. The basic arrangement of components in the projector-type headlamp according to the embodiment of the present invention is similar to that in the conventional projector-type headlamp shown in FIGS. 1 to 3, except for the construction of the concave mirror which reflects the light rays emitted from the lamp bulb toward the convex lens.

The reflecting inner surface of a concave mirror 6 in the projector-type headlamp according to the present invention has a reflecting area 10 of which the optical characteristics are such that the light rays emitted from the lamp bulb and incident upon the concave mirror are reflected toward the meridional image plane of the convex lens, the reflecting area having formed in at least a portion thereof a light diffusion area 12 consisting of a portion of each of different curved conical surfaces. The light diffusion area 12 consists vertically of elongated segments. The segments are defined by a plurality of regularly spaced vertical planes parallel to the optical axis. The segments are formed of conical surfaces each having a different radius of curvature.

Figure 12A:
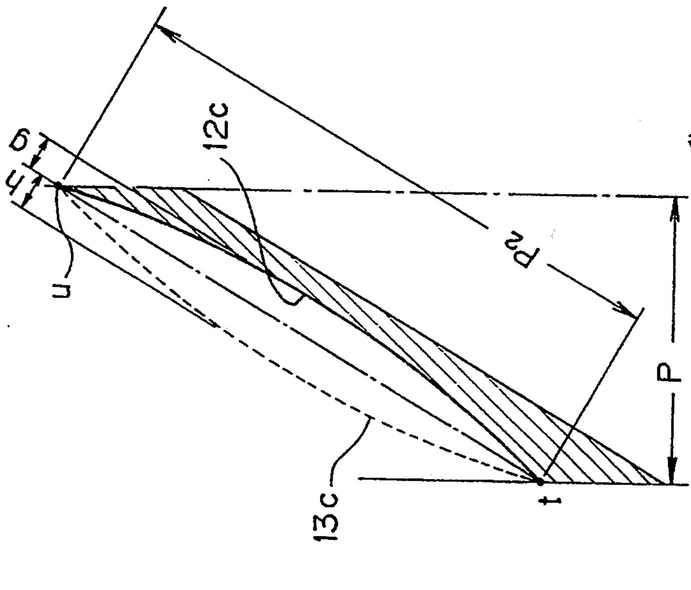
FIG. 12(A) is a sectional view, partially enlarged in scale, of the horizontal sectional view taken along the line 11B—11B in FIG. 10 of one segment near the portion c in FIG. 11.
Figure 12B:
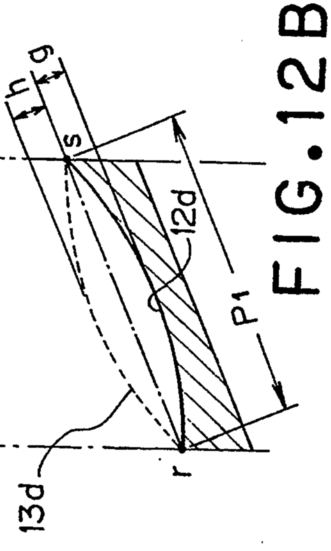
FIG. 12(B) is a sectional view, partially enlarged in scale, of the horizontal sectional view taken along the line 11A—11A in FIG. 10 of one segment near the portion d in FIG. 11.
Figure 10:
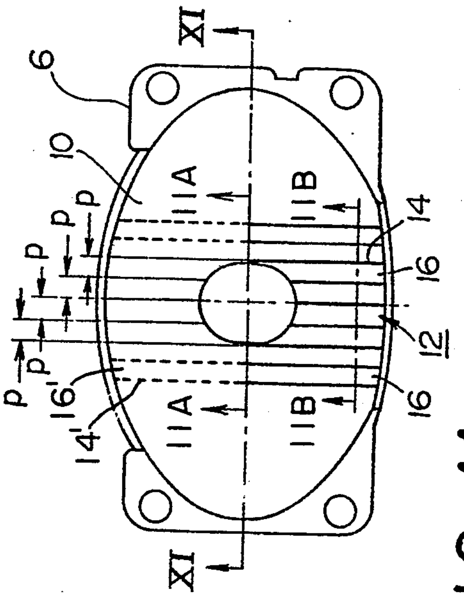
Figure 11:
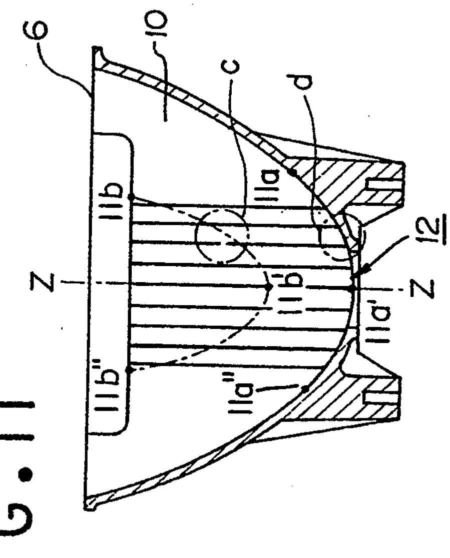

The light diffusion area 12 according to the present invention will be discussed in detail below. The light diffusion area 12 consists of a plurality of segments 16 defined by a plurality of vertical planes 14 perpendicular to the horizontal plane in which the optical axis Z—Z lies and regularly spaced with a pitch P. FIG. 12(A) is a horizontal sectional view, enlarged in scale, of a curved conical surface 12*c* formed correspondingly to a segment in a portion relatively far from the lamp bulb, typically, the portion c, and FIG. 12(B) is a horizontal sectional view, enlarged in scale, of a curved conical surface 12*d* formed correspondingly to a segment in a portion relatively near the lamp bulb, typically, the portion d. The dot-dash lines t–u and r–s in FIGS. 12(A) and 12(B), respectively, are reference planes for forming the light diffusion area 12. The reference planes correspond to the level of the reflecting area 10, but the reflecting area 10 itself is not shown in FIGS. 12(A) and 12(B). The reference planes should be shown as a part of an ellipse in FIGS. 12(A) and 12(B), but they are shown as fitted to the straight lines such as the dot-dash lines t–u and r–s. These curved conical surfaces 12*c* and 12*d* are formed as diffusion surfaces being concave with respect to the reference planes, but they may be formed as curved conical surfaces 13*c* and 13*d* being convex with respect to the reference planes as indicated with dot lines.

In Figures, the curved conical surface 12*c* is depicted as a concave arc having a larger radius of curvature than that of the curved conical surface 12*d*. However, they are cubically different concave curved conical surfaces. Similarly, the curved conical surfaces 13*c* and 13*d* are cubically different convex curved conical surfaces. In other words, the concave (or convex) conical surfaces each have a different radius of curvature and differ from each other in their three-dimensional configuration.

Figure 14A:
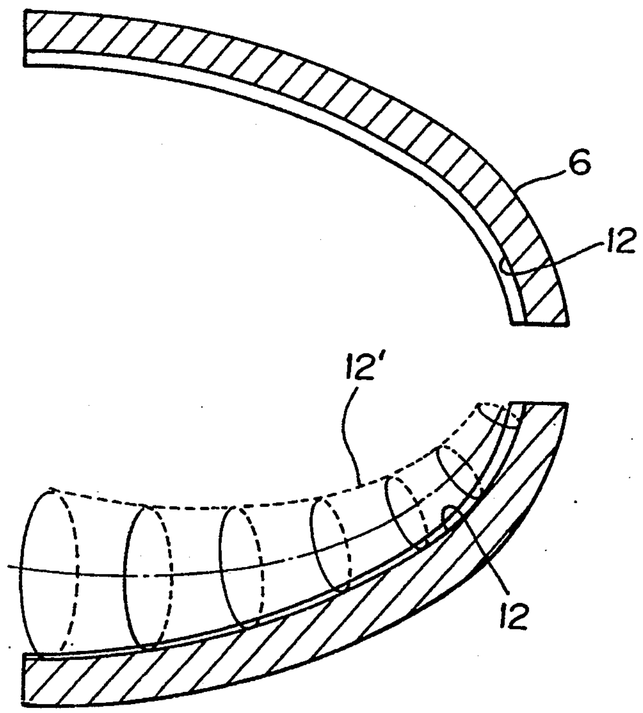
FIGS. 14(A) and 14(B) are schematic diagrams for explanation of the curved conical light diffusion surface.
Figure 14B:
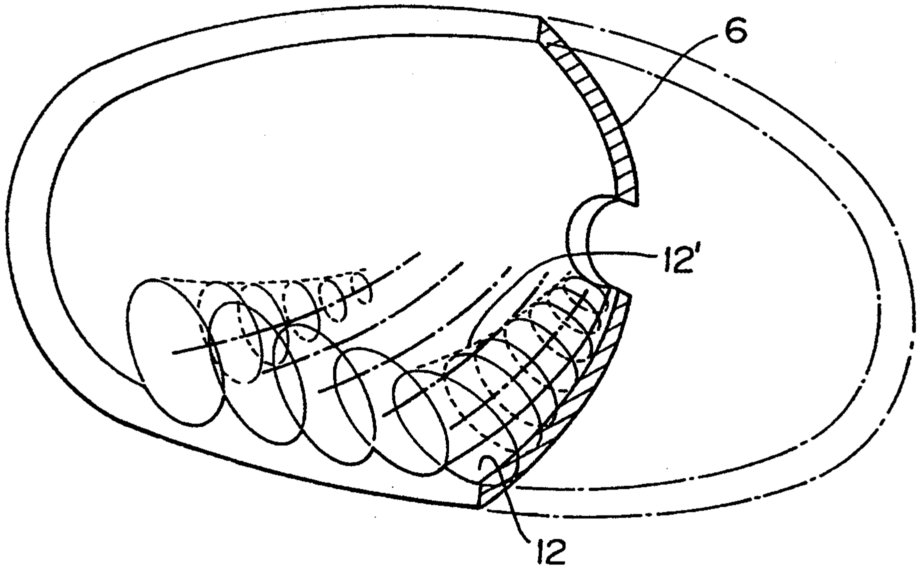

FIG. 14(A) is a schematic sectional view of the concave mirror 6 cut by a vertical plane in which the optical axis lies. The actual light diffusion surface 12 is formed as concave taking the same form as a portion of the surface of a curved cone 12' indicated with a dot line. FIG. 14(B) is a schematic view of the concave mirror cut by the vertical plane including the optical axis and viewed obliquely from above. In FIG. 14(B), a plurality of curved cones 12' is disposed leftward from the center and the center lines of these cones are parallel to each other. Note that these Figures are given for better understanding of the light diffusion surface 12 having the curved conical surfaces and do not show the actual shape of the detail of the light diffusion surface 12.

According to the present invention, the maximum distance, that is, depth g, from the curved conical surfaces 12*c* and 12*d* to the reflecting area, respectively, as reference plane, is constant, and the maximum distance between the different curved conical surfaces and reference planes for the segments 16 is also constant. In the previously mentioned conventional projector-type headlamp, each of the segments forming together the reflecting inner surface is formed as a curved cylindrical surface and so the radius of curvature of the light diffusion area is constant. The light diffusion area formed according to the present invention is formed from curved conical surfaces of which the radius of curve varies from one segment to another. In this embodiment, the depth g is 0.04 mm and inter-segment pitch P is 4.5 mm. A desired angle of light diffusion can be obtained by changing these values g and P.

Thus, for example, the curved conical surface 12 corresponding to the portion c shown in FIG. 12(A), of which the creeping pitch P2 is larger, has a larger radius of curvature and diffuses the light rays at a low rate, while the curved conical surface 12*d*, for example, corresponding to the portion d in FIG. 12(B), of which the creeping pitch P1 is smaller, has a smaller radius of curvature and diffuses the light rays at a high rate.

By forming, on a portion of the reflecting inner surface, such as the portion d, nearer the lamp bulb and thus forming primarily the hot zone, a light diffusion area which diffuses the light rays at a high rate, it is possible to alleviate the driver's feeling that the luminosity of the hot zone is too strong. And by forming, on a portion of the reflecting inner surface, such as the portion c, farther from the lamp bulb and thus not involved in forming the hot zone, a light diffusion area which diffuses the light rays at a low rate, it is possible to prevent the whole luminous intensity distribution pattern from being adversely affected.

The foregoing description applies to the projector-type headlamp in which the light diffusion surfaces, that is, the curved conical surfaces 12*c* and 12*d*, are formed concave with respect to the reference planes indicated with the dot-dash lines t–u and r–s, respectively. However, the light diffusion surfaces, that is, the curved conical surfaces 13*c* and 13*d*, convex with respect to the reference planes, will provide a similar effect.

Next, how to set the concave curved conical surfaces 12*c* and 12*d* and convex curved conical surfaces 13*c* and 13*d* will be described referring to FIGS. 13(A) to 13(C) in this order.

Figure 13A:
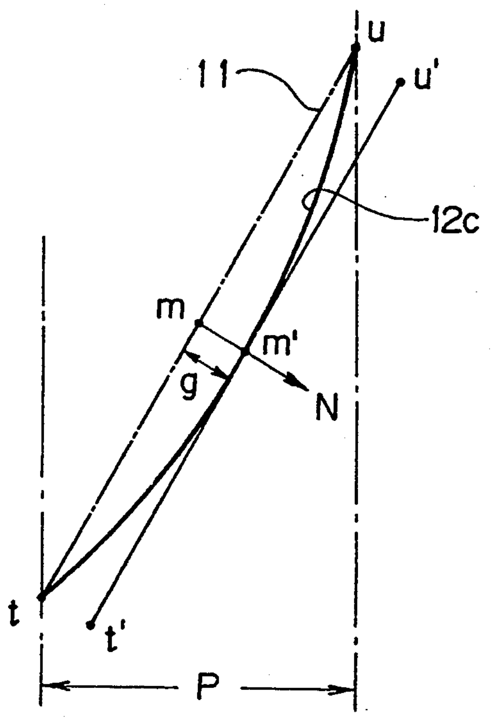
FIGS. 13(A) to 13(C) are drawings for explaining how to set the curved conical light diffusion surface which is to be formed on the concave mirror.

FIG. 13(A) is a drawing for explanation of how to obtain the concave curved conical surface 12*c* shown in FIG. 12(A). The points t and u and pitch P in FIG. 13(A) correspond to the points t and u and pitch P, respectively, in FIG. 12(A). The depth g of the concave surface also corresponds to the depth g in FIG. 12(A), but the depth g is shown enlarged in scale for the convenience of the illustration and description.

The dot-dash line t–u indicates the level of the reflecting area as reference plane. This line t–u can be obtained by designing it in such a manner as to reflect the light rays emitted from the lamp bulb and incident upon the reflecting area 12 toward the meridional image plane of the convex lens. In this embodiment, the line t–u is calculated by a computer and plotted based on a diagram. If the pitch P between adjoining segments is set small, the sectional curve indicated with the dot-dash line t–u is considered to be a nearly straight line in the respects of scale and drawing precision of FIG. 13. It is assumed here that the middle point of the dot-dash line t–u is m. The dot-dash line t–u is moved a predetermined distance g in parallel in the direction of a line normal, indicated with the arrow N, to the reference plane.

As a result of the above parallel movement of the dot-dash line t–u, the point t is moved to a point t′, the point u to a point u′ and the point m to a point m′, respectively. This movement means that the points are moved in the drawing step in the phase of designing. After the above movement of the points, an arc t–u indicated with a solid line passing by the points t, m′ and u is obtained.

The method having been described above with reference to FIG. 13(A) is based on the principle of drawing. For a more effective determination of the arc t–u, the dot-dash line may not be moved in parallel but it suffices to move only the middle point rn a distance g in the direction of arrow N in order to obtain the point m′ and obtain an arc passing by the three points t, m′ and u. By forming a conical recess having the sectional form of the arc (indicated with a solid line) t–u thus obtained, the light diffusion surface 12*c* concave with respect to the reference plane can be obtained.

Figure 13B:
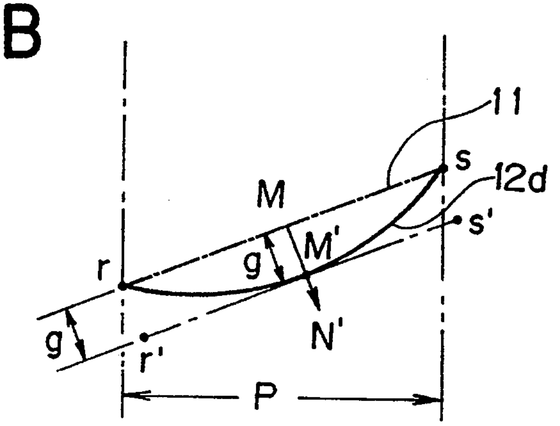

FIG. 13(B) is a drawing for explanation of how to obtain the light diffusion surface 12*d* concave with respect to the reference plane shown in FIG. 12(B). A similar method to that shown in FIG. 13(A) is used to obtain the sectional line r–s of the reference plane and the sectional line r–s is moved a dimension g in parallel in the direction of normal line (indicated with the arrow N′) to obtain r′–s′. Thus the middle point N is moved to a point M′. Then, an arc (solid line) r–s passing by the points r, M′ and s is obtained.

Figure 13C:
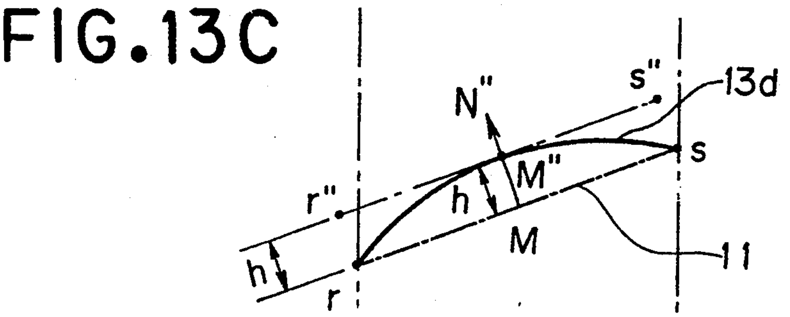

FIG. 13(C) shows how to obtain the light diffusion surface r–s of which the section takes the form of a convex arc indicated with a dot line in FIG. 12(B). A similar reference plane r–s to that r–s shown in FIG. 13(B) is moved a distance h toward inside the reference plane in the direction of arrow N″ to obtain a middle point M″ resulted from the movement of the middle point M of the reference plane r–s, thereby obtaining the light diffusion surface 13*d* of which the section takes the form of a convex arc (solid line) passing by the three points r, M″ and s. This method is used to obtain the convex arc-like light diffusion surface 13*d* shown in FIG. 12(B). The convex arc-like circular light diffusion surface 13*c* shown in FIG. 12(A) can also be obtained in a generally similar manner.

Figures 7A, 7B:
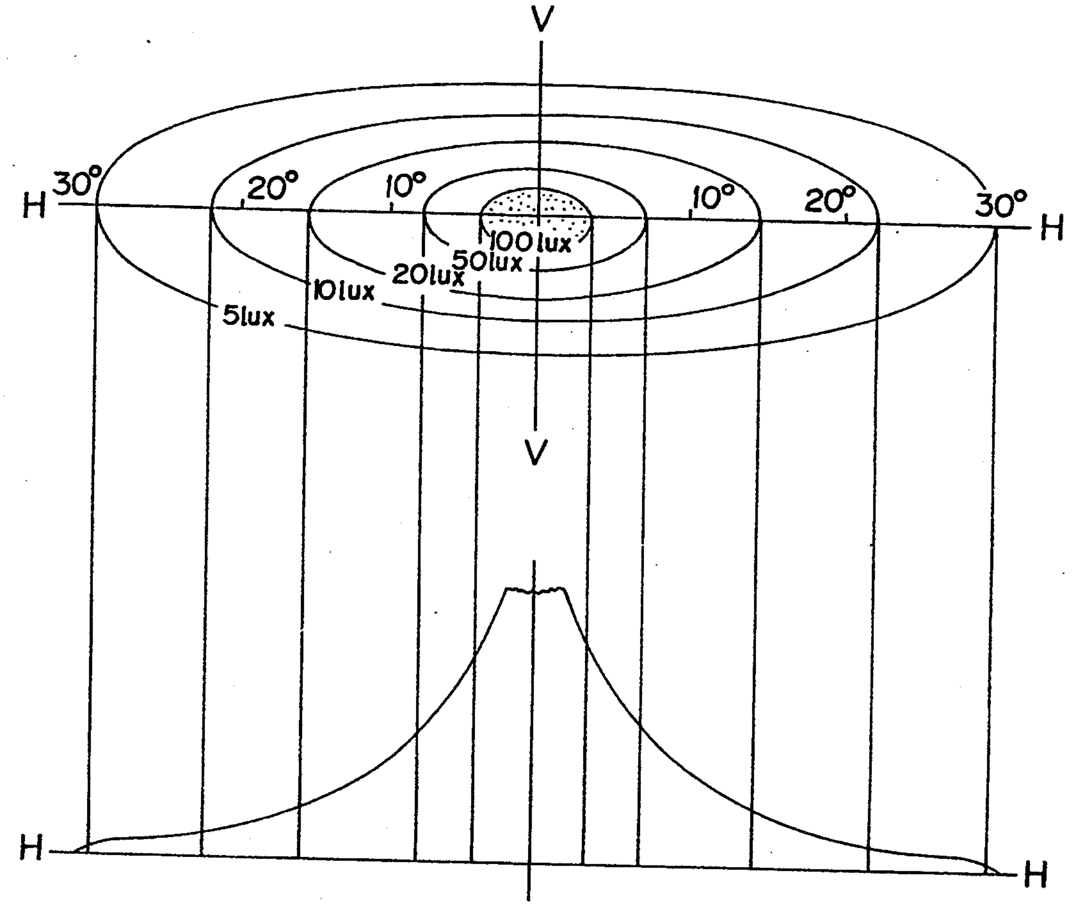
FIG. 7A PRIOR ART
FIG. 7B PRIOR ART
FIGS. 7(A) and 7(B) are schematic views showing an isolux line and luminosity distribution, respectively, for explanation of the unevenness of luminous intensity distribution in the hot zone formed by the conventional projector-type headlamp.
Figure 8:
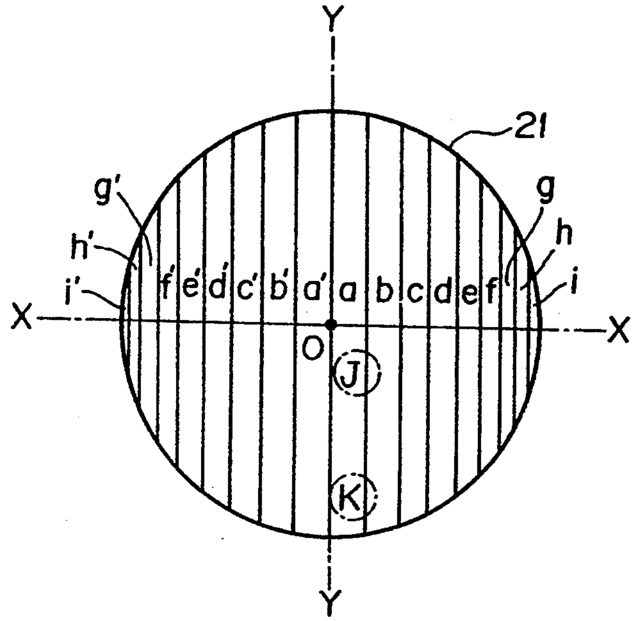
FIG. 8 PRIOR ART
FIG. 8 is a front view of the concave mirror used in the conventional projector-type headlamp, having a light diffusion surface to minimize the unevenness of luminous intensity distribution in the hot zone.
Figure 9:
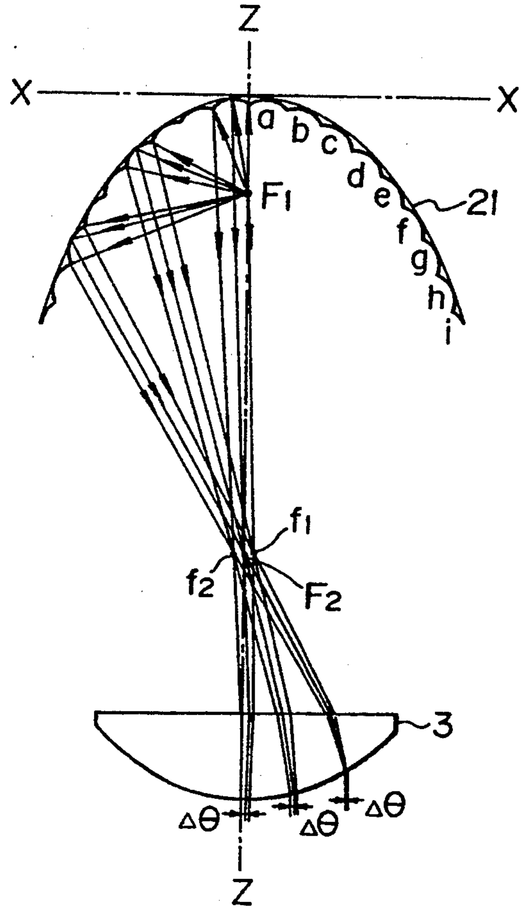
FIG. 9 PRIOR ART
FIG. 9 is a schematic horizontal sectional view for explanation of the action of the concave mirror used in the projector-type headlamp shown in FIG. 8.
Figures 15A, 15B:
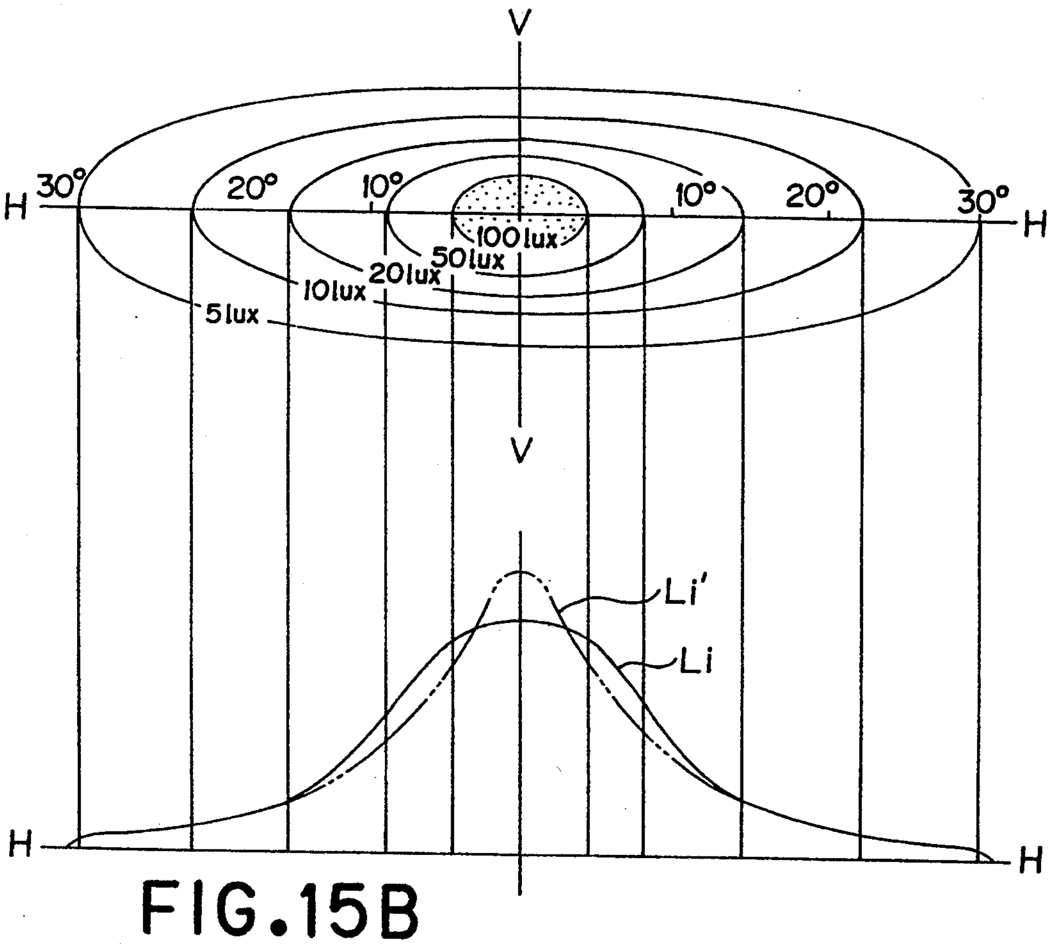
FIGS. 15(A) and 15(B) are schematic views, showing the isolux line and luminosity distribution, respectively, of the luminous intensity distribution pattern according to the embodiment of the present invention.

FIG. 15 shows a luminous intensity distribution pattern obtained with the projector-type headlamp according to the embodiment having been described in the foregoing. It contains an isolux line and luminosity distribution diagram Li. For the purpose of comparison, the luminosity distribution diagram Li′ produced by the conventional projector-type headlamp shown in FIG. 7(B) is also shown as indicated with a two dot-dash line in FIG. 15. As seen, a rational diffusion rate distribution can be obtained by forming an appropriate curve conical light diffusion surface for a high diffusion rate at the central portion of a concave mirror, which forms a hot zone, as well as for a low diffusion rate at the peripheral portion of the concave mirror, which is not much contributed to forming of the hot zone. Thus, it will be appreciated by those skilled in the art that the driver's feeling that the luminosity in the hot zone formed by the projector-type headlamp is too strong can be alleviated without any adverse affect on the luminous intensity distribution in other than the hot zone.

In this embodiment, the diffusion area 12 of the concave mirror 6 is disposed below the horizontal plane in which the optical axis lies. However, the present invention is not limited to this arrangement. The reasons will be discussed below.

Figure 5:
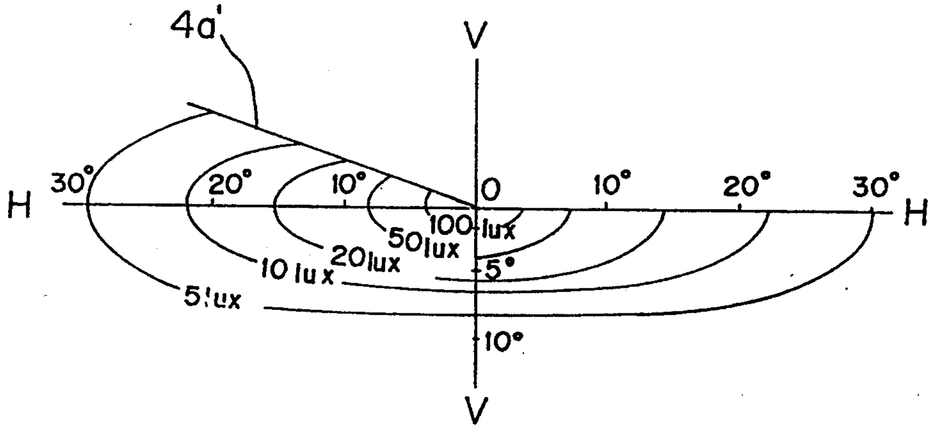
FIG. 5 PRIOR ART
FIG. 5 is a schematic view of the luminous intensity distribution pattern projected on a screen 10 m away from the light source.
Figure 6:
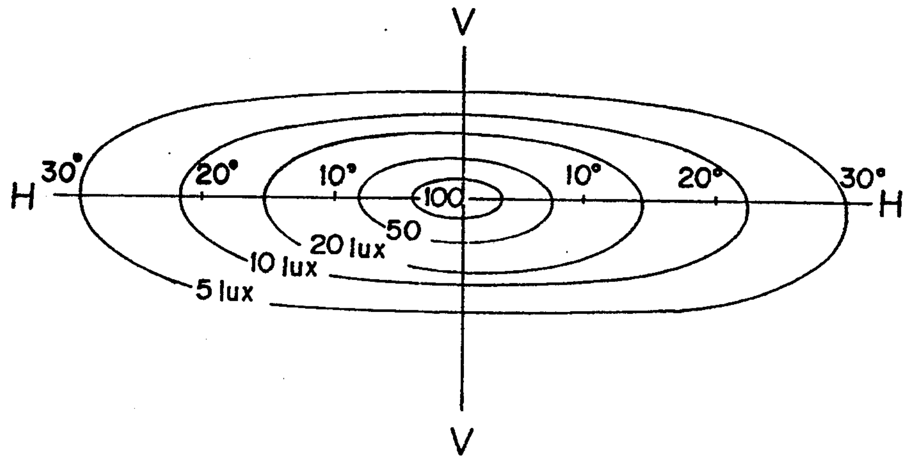
FIG. 6 PRIOR ART
FIG. 6 is a schematic view of the luminous intensity distribution pattern produced the projector-type headlamp without the shade therein.

A luminous intensity distribution pattern produced by a projector-type headlamp having a shade to form a bright/dark boundary in the pattern is schematically shown in FIG. 5, and a luminous intensity distribution pattern produced by a projector-type headlamp having no such shade is schematically shown in FIG. 6.

The projector-type headlamp according to the present invention is provided with a shade 4 which yields a luminous intensity distribution pattern which is similar to that shown in FIG. 5 and illuminates primarily below the horizontal line H—H. Thus, the light rays reflected at the upper half of the concave mirror illuminate a relatively wide range of the zone near the central portion below the line H—H. Therefore, when it is intended to diffuse such light rays in order to alleviate the driver's feeling that the luminosity in the hot zone is too strong, the light diffusion surface should suitably be disposed above the horizontal plane including the optical axis lies as indicated with dotted lines 14′ and surface 16′ of FIG. 10. In this case, it does not matter whether or not the light diffusion surface is disposed below the horizontal plane in which the optical axis lies.

The reflected light rays from the lower half below the horizontal plane including the optical axis are concentrated near the point O shown in FIG. 5. Therefore, in order to make uniform the luminosity in an area near the point O even in case the projector-type headlamp is provided with a shade 4, the light diffusion surface should preferably be disposed below the horizontal plane including the optical axis.

In case of a projector-type headlamp having no shade and intended for illuminating both above and below the horizontal line H—H and also both right and left of the vertical line V—V, the distribution of light beam is nearly symmetrical with respect to the horizontal line H—H. In this case, the light diffusion surface may be disposed on the generally whole surface of the concave mirror (i.e., 14,16 and 14′, 16′).

As mentioned above, the central portion of the reflecting inner surface of the concave mirror is much involved in forming the hot zone as compared with the peripheral portion of the reflecting inner surface. With the concave curved conical surfaces 12*c* and 12*d* or the convex curved conical surfaces 13*c* and 13*d*, a same optical effect can be assured. However, in injection molding of the concave mirror from a synthetic resin, the concavity or convexity of the mold corresponds to the convexity or concavity of the concave mirror. Therefore, a mold with a recess for the convexity can be produced more easily and economically than one having a projection for the concavity. Taking account of this fact for the economy, a concave mirror having a light diffusion surface consisting of the convex curved conical surfaces 13*c* and 13*d* shown in FIGS. 12(A) and 12(B) should preferably be used.

What is claimed is:

1. A projector-type headlamp comprising:

a concave mirror having a reflecting inner surface with a center axis;

a lamp bulb having an optical axis which is coincident with the center axis of the concave mirror; and a convex lens having a meridional image plane, said convex lens forming rays of light emitted from the lamp bulb and reflected at the concave mirror into a light beam nearly parallel to the optical axis and projecting the light beam forwardly, said inner surface of the concave mirror including, a reflecting area having optical characteristics such that the light rays emitted from the lamp bulb and incident thereupon are reflected toward the meridional image plane of the convex lens, and at least one light diffusion area having a plurality of regularly spaced and vertically elongated segments formed of conical surfaces each of said conical surfaces in a segment having a different radius of curvature with respect to one another so that a maximum distance between each conical surface and a plane of the reflecting area is constant independently of a location of the conical surface.

2. A projector-type headlamp as set forth in claim 1, wherein a shade is provided between the lamp bulb and the convex lens to provide a slanted cut line in the projected light beam.

3. A projector-type headlamp as set forth in claim 2, wherein said light diffusion area is disposed below a horizontal plane in which a center axis of the concave mirror lies.

4. A projector-type headlamp as set forth in claim 3, wherein said light diffusion area is disposed near the center axis of the concave mirror.

5. A projector-type headlamp as set forth in claim 4, wherein said conical surface is concave with respect to the reflecting area.

6. A projector-type headlamp as set forth in claim 4, wherein said conical surface is convex with respect to the reflecting area.

7. A projector-type headlamp as set forth in claim 1, wherein said light diffusion area is disposed above a horizontal plane in which a center axis of the concave mirror lies.

8. A projector-type headlamp as set forth in claim 7, wherein a shade is provided between the lamp bulb and the convex lens to provide a slanted cut line in the projected light beam.

9. A projector-type headlamp as set forth in claim 8, wherein said light diffusion area is disposed near the center axis of the concave mirror.

10. A projector-type headlamp as set forth in claim 9, wherein said conical surface is concave with respect to the reflecting area.

11. A projector-type headlamp as set forth in claim 9, wherein said conical surface is convex with respect to the reflecting area.

12. A projector-type headlamp as set forth in claim 1, wherein said light diffusion areas are disposed both above and below a horizontal plane in which a center axis of the concave mirror lies.

13. A projector-type headlamp as set forth in claim 12, wherein said light diffusion areas are disposed near the center axis of the concave mirror.

14. A projector-type headlamp as set forth in claim 13, wherein said conical surface is concave with respect to the reflecting area.

15. A projector-type headlamp as set forth in claim 13, wherein said conical surface is convex with respect to the reflecting area.

16. A projector-type headlamp comprising:

a concave mirror having a reflecting inner surface with a center axis;

a light source having an optical axis coincident with the center axis of the concave mirror;

a convex lens having a meridional image plane, said convex lens receiving light rays emitted from said light source and reflected at the concave mirror and projecting a light beam in a forward direction; and at least one light diffusion area on said reflecting inner surface of the concave mirror, said light diffusion area having a plurality of regularly spaced and vertically elongated segments formed of conical surfaces each of said conical surfaces in a segment having a different radius of curvature with respect to one another, wherein a maximum distance between each conical surface and a corresponding reference plane, in a direction normal to the corresponding reference plane, is constant independent of a location of the conical surface, said corresponding reference plane being defined by a set of points relative to said conical surface from which light rays from said light source would be reflected to the meridional plane.

* * * * *